Jan. 1, 1952
C. A. TEA
2,580,975
AUXILIARY SPRING SUSPENSION
Filed Aug. 6, 1948
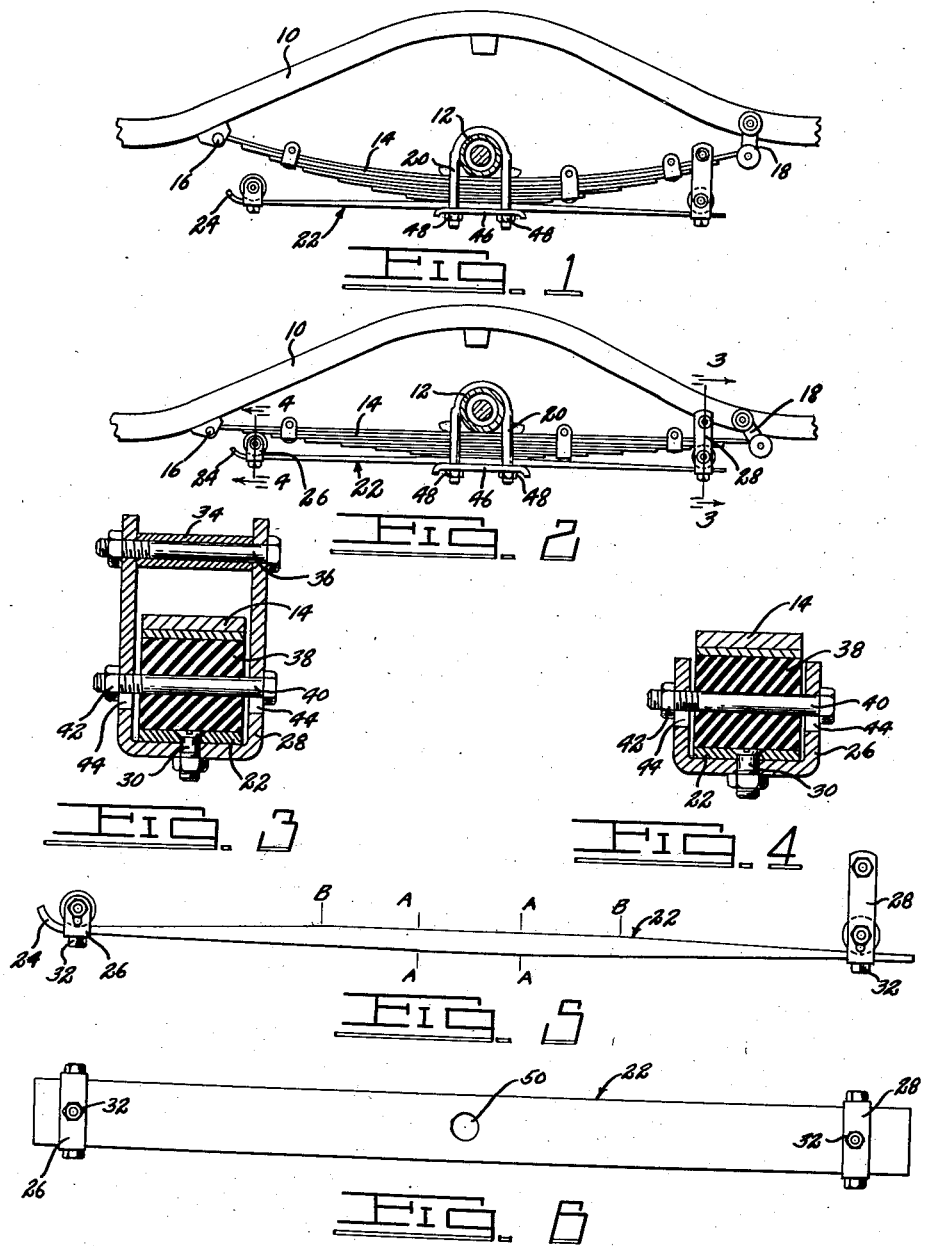
INVENTOR.
CLARK A. TEA
BY
ATTORNEY Patented Jan. 1, 1952

2,580,975

UNITED STATES PATENT OFFICE 2,580,975

AUXILIARY SPRING SUSPENSION

Clark A. Tea, Detroit, Mich.

Application August 6, 1948, Serial No. 42,951

1 Claim. (Cl. 267—45)

This invention relates to a spring suspension, and more particularly to an auxiliary leaf spring for use in cooperation with a spring suspension for an automobile.

Multiple leaf springs are commonly employed as a suspension means for the body of a vehicle on its axle. These springs are designed in production to suspend loads within normal ranges and are unsatisfctory under overload conditions.

It has become common practice for standard vehicles to be used in drawing trailers wherein a portion of the trailer load is carried by the vehicle. This in addition to the passenger load in the vehicle causes the rear vehicle springs to carry a load for which they were never designed to take. The standard springs of the vehicle being overloaded soon fatigue and become broken and the quality of the vehicle ride has been impaired.

Auxiliary devices have been provided to compensate for such overload conditions but such have been expensive to manufacture, difficult to assemble and result in poor riding qualities of the vehicle, not only with an overload but are unsatisfactory with an underload.

It is an object of the present invention to provide an auxiliary leaf spring which is inexpensive to manufacture and easily applied to a standard vehicle without special parts or modification of the standard spring structure.

Another object of the invention is to design and arrange the auxiliary spring to function only during an overload condition, the latter being disassociated from the standard spring structure during normal loads.

A further object of the invention is to provide a leaf spring having variable resilient characteristics throughout its length.

Other objects and advantages of the invention will more fully appear from the following description taken in connection with the accompanying drawings in which:

Fig. 1 is a fragmentary side elevational view of a vehicle suspension, showing the improved auxiliary spring installation but not in an operating position;

Fig. 2 is a view corresponding to Fig. 1 but showing the auxiliary spring stressed as in operating position;

Fig. 3 is an enlarged sectional view taken on line 3—3 of Fig. 2;

Fig. 4 is an enlarged sectional view taken on line 4—4 of Fig. 2;

Fig. 5 is an enlarged side elevational view of the auxiliary spring; and

Fig. 6 is a bottom plan view of Fig. 5.

Referring to the drawings, I have shown a portion of a vehicle frame 10 which is suspended over an axle 12 by a multiple leaf spring 14. The forward end of the spring 14 is pivotally supported to the frame at 16 and the opposite end of the spring 14 is supported to the frame by a swinging shackle 18. The axle is secured to the center of the spring by U bolts 20.

The auxiliary spring is shown generally at 22 and comprises a strip of steel substantially equal in length to the length of the spring 14 and having a width substantially equal to the width of the spring 14.

The spring 22 in its unstressed condition is generally straight as viewed in side elevation with the exception that one end, preferably the front end, is curved slightly upwardly as indicated at 24.

The upper and bottom surfaces of the spring 22 are parallel at the center of the spring between points A—A and the upper or tension side of the spring is straight from the center to a point B and is in the same plane as the portion of the upper surface between the points A—A. The upper surface, from the point B to the outer ends of the spring is tapered downwardly and the lower surface of the spring is tapered upwardly to the outer ends of the spring.

Adjacent the opposite ends of the spring 22 I have provided U clamps 26 at the forward end and 28 at the rear end. The bare portion of the U is secured to the spring by a headed bolt 30 passing through the spring 22 and base of the U and held by a nut 32. The side flanges of the U bracket 28 extend upwardly along the opposite edges of the spring 14 to serve as lateral supports to prevent relative turning movement of the springs 14 and 22. The outer free ends of the U bracket 28 are retained against inward and outward movement by a sleeve 34 therebetween and a bolt and nut holding device 36 extending through the bracket ends and the sleeve 34.

Both brackets 26 and 28 are provided with cylindrical resilient members 38, preferably of rubber, which have their outer peripheries resting on the upper surface of the spring 22. A headed bolt 40 passes through the side flanges of the brackets 26 and 28 and through the resilient members 38 and a nut 42 secures the parts in assembled position. Slots 44 are formed in the side flanges of the brackets 26 and 28 for receiving the bolts 40 to permit vertical movement of the bolt caused by the compression forces between the two springs 14 and 22, under overload conditions, to prevent the bolts from carrying any of the compression forces.

When the auxiliary spring 22 is applied to a standard multiple leaf spring, the spring pad 46 is removed by removing the U bolt nuts 48 and the spring 22 is placed beneath the leaf spring 14.

An aperture 50 in the spring 22 fits over the nut, not shown, for holding the multiple leaves of the spring 14 together, in standard spring design. The spring pad 46 is then replaced and the nuts 48 are applied to the U bolts 20. The sleeve 34 is then placed between the side flanges of the bracket 28 and the bolt 36 is applied.

Under normal conditions the auxiliary spring 22 is in the position shown in Fig. 1 and is supporting no weight of the vehicle. When the vehicle is overloaded, the spring 14 is flexed to a point where the lower surface of the spring 14 strikes the resilient members 38 transferring a portion of the load to the ends of the spring 22.

If it is desired to use the vehicle as a pleasure vehicle without an overload or a trailer, it is not necessary to remove the auxiliary spring to obtain normal riding conditions because the auxiliary spring is inoperative and will not interfere with the normal action of the spring 14. However, upon any overload the auxiliary spring 22 comes into action.

While the invention has been illustrated and described in its preferred form, it will be understood that various changes including the size, shape and arrangement of parts may be made without departing from the spirit of my invention and it is not my intention to limit its scope other than by the terms of the appended claim:

I claim:

An auxiliary spring for the spring suspension of an automobile comprising; a leaf spring having tapered end portions, a U-shaped bracket having its base secured to the spring adjacent each of its ends, a bolt slidably carried by each said bracket, and a resilient member supported by each said bolt and resting upon the upper surface of said leaf spring; one of said brackets having a spacer between its outer free ends spaced from said resilient member.

CLARK A. TEA.

REFERENCES CITED

The following references are of record in the file of this patent:

UNITED STATES PATENTS

| Number | Name | Date |
| --- | --- | --- |
| 1,408,394 | Peltier | Feb. 28, 1922 |
| 1,509,618 | Sorenson | Sept. 23, 1924 |
| 1,683,075 | Hughes | Sept. 4, 1928 |
| 1,814,214 | Gross | July 14, 1931 |
| 2,188,689 | Marco | Jan. 30, 1940 |
| 2,211,647 | Collier | Aug. 13, 1940 |